United States Patent [19]

Emmerling et al.

[11] Patent Number: 4,537,014
[45] Date of Patent: Aug. 27, 1985

[54] PACKAGING MACHINE

[75] Inventors: Hans-Jörg Emmerling, Kürten; Josef Hamm, Bergisch Gladbach, both of Fed. Rep. of Germany

[73] Assignee: Robert Bosch GmbH, Stuttgart, Fed. Rep. of Germany

[21] Appl. No.: 375,910

[22] Filed: May 7, 1982

[30] Foreign Application Priority Data

May 7, 1981 [DE] Fed. Rep. of Germany ....... 3118078

[51] Int. Cl.³ ............................................. B65B 43/26
[52] U.S. Cl. ........................................ 53/570; 53/385; 53/386
[58] Field of Search ................. 53/385, 386, 570, 571, 53/572, 573, 167, 393; 493/418, 450, 477, 480; 211/123, 182, 191; 285/61, 137 R, 189

[56] References Cited

U.S. PATENT DOCUMENTS

| 1,886,376 | 11/1932 | Dambacher | 53/385 |
| 2,649,674 | 4/1953 | Bartelt | 53/89 |
| 2,670,887 | 3/1954 | Landgraber | 53/385 X |
| 2,760,319 | 8/1956 | Just | 53/167 |
| 2,834,166 | 5/1958 | Fogwell et al. | 53/385 X |
| 2,885,846 | 5/1959 | Harker | 53/124 |
| 2,907,160 | 10/1959 | Friedman et al. | 53/167 X |
| 2,924,924 | 2/1960 | Garapolo et al. | 53/512 |
| 3,424,290 | 1/1969 | Betschart | 53/385 X |
| 3,553,934 | 1/1971 | Johnson et al. | 53/183 |
| 3,620,363 | 11/1971 | Donnithorne | 211/123 X |
| 4,098,049 | 7/1978 | Jackson et al. | 53/434 |
| 4,148,473 | 4/1979 | Johnson | 414/121 X |
| 4,151,847 | 5/1979 | van Donkelaar | 17/1 G |

FOREIGN PATENT DOCUMENTS

| 499609 | 2/1954 | Canada | 53/434 |
| 1272708 | 10/1960 | France | 211/123 |

Primary Examiner—John Sipos
Assistant Examiner—Steven P. Weihrouch
Attorney, Agent, or Firm—Edwin E. Greigg

[57] ABSTRACT

The frame for a packaging machine, of welded construction, is proposed to be simply and inexpensively manufacturable yet be very rigid and stable. It has two end walls, a plurality of intermediate walls, two support beams and crosspieces, which are welded to one another. The intermediate walls, which are all of identical shape, are made of sheet steel, and the crosspieces are made of steel tubes. The steel tubes are sealed at their ends and serve as supply containers for compressed air and underpressure.

2 Claims, 2 Drawing Figures

U.S. Patent  Aug. 27, 1985  4,537,014
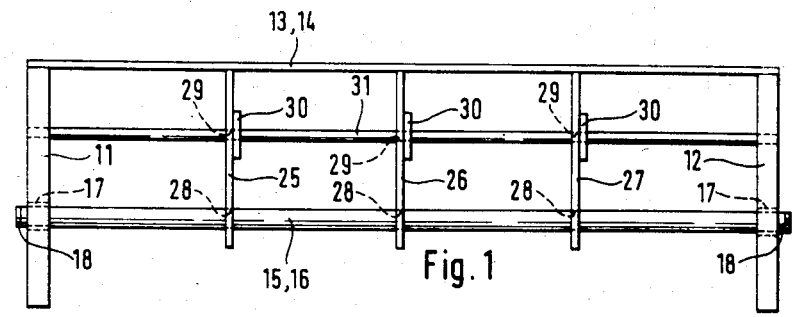
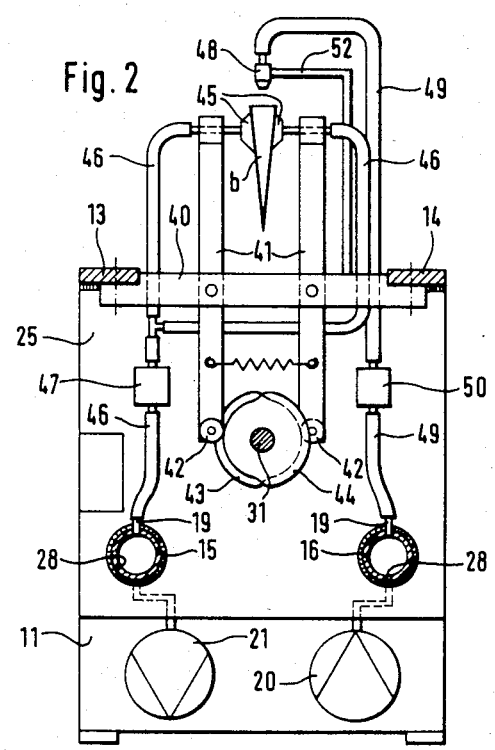

PACKAGING MACHINE

BACKGROUND OF THE INVENTION

The invention is based on a packaging machine for shaping, filling and closing flat-pouch packages. The frames of packaging machines are predominantly cast structures, the reference and contact faces of which are machined in a chip-removing manner. A precondition for such machining is large machine tools, so such a process is very expensive. Frames which are welded together from steel plates and rails are also known, but such frames lack rigidity and are not universally usable.

OBJECT AND SUMMARY OF THE INVENTION

The packaging machine according to the invention has the advantage that the machine frame is not only highly rigid but can also be fabricated with simple means to very precise dimensions. The use of the tubes are crosspieces, which lends the machine frame its great rigidity, has the further advantage that if the ends of the tubes are sealed off then the tubes are usable as supply containers for compressed air or for underpressure.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1 shows a machine frame in a front elevational view; and

FIG. 2 shows the machine frame of FIG. 1 in cross section.

DESCRIPTION OF THE PREFERRED EMBODIMENT

The frame intended for constructing a packaging machine, for instance a machine for shaping, filling and closing flat-pouch packages, has an elongated, table-like shape. It has two upright, rectangular end walls 11, 12 of cast metal, which also serve as feet; two horizontal support beams 13, 14 resting on these end walls; and two horizontal crosspieces 15, 16 in the lower part. The support beams 13, 14 are flat steel rails of the type conventionally available in commerce and are secured onto the corner areas of the end walls. They serve to support individual processing devices of the packaging machine.

The two crosspieces 15, 16, which are made of conventional steel tubes available in commerce, connect the end walls 11, 12 in the lower half of the frame and are located more or less congruently beneath the support beams 13, 14 but are shifted somewhat toward the middle of the end walls 11, 12. They pass through the end walls 11, 12, into which a sheath 17 of steel has been poured at each location where the support beams 13, 14 enter the end walls 11, 12, and are welded to these sheaths 17. Caps 18 are welded onto the ends of the hollow crosspieces 15, 16, so that the tubes are usable as supply containers for compressd air or underpressure. Connector fittings 19 (see FIG. 2) can be threaded into apertures of the tubes or cap 18 at various locations for the purpose of establishing connections with a source of compressed air 20, a source of air suction 21 and consumers.

A plurality of intermediate walls 25, 26, 27 (for instance, three) is disposed at equal distances between the two end walls 11, 12; however, their height is less than that of the end walls 11, 12. The intermediate walls 25–27 are cut from thick sheet metal steel and are machined in packets. For instance, plane milling of the contact faces is performed for the support beams 13, 14 and the apertures 28 for the crosspieces 15, 16 and other apertures 29 for shafts and lines are drilled, so that dimensional accuracy of the frame is attained. The intermediate walls 25–27 are welded at the top to the support beams 13, 14 and to the crosspieces 15, 16 at the bottom. Bearing means 30 for a control shaft 31 are approximately secured on the intermediate walls 25–27 coaxially with the apertures 29.

The processing devices, of which a device for opening pouches b is shown in FIG. 2, are each constructed on a plate 40, which rests on the underside of the crossbeam 13, 14 and is threaded onto it. Two levers 41, protrude through an aperture in the plate 40, being supported pivotably in the plate 40, resting with rollers 42 on contour plates or cam means 43, 44 on the control shaft, and carrying plural suction means 45. The suction means 45—45 are connected via conduits or lines 46—46 and a control valve 47 with a connector fitting on the crosspiece 15, which is connected with the source of air suction 21. A nozzle 48 projects from above toward the pouch opening; the nozzle is connected via a suitable conduit or line 49 and a control valve 50 with a connector fitting 19 on the other crosspiece 16, which is connected to the source of compressed air 20. A support 52 secured to the plate 40 carries the nozzle 48.

The foregoing relates to a preferred exemplary embodiment of the invention, it being understood that other embodiments are variants thereof are possible within the spirit and scope of the invention, the latter being defined by the appended claims.

What is claimed and desired to be secured by letters patent of the United States is:

1. A packaging machine having an elongated frame provided with two rigid apertured end walls with a lower end that forms feet and an upper portion; two support beams connected to said end walls at the upper portion along an edge thereof; at least one support plate secured between two support beams, a suction means supported by said plate for opening a bag to be filled and air blowing means to blow air into said bag for opening said bag;

a plurality of spaced, apertured, plate-like intermediate walls of identical shape disposed between said end walls parallel thereto and extending from and fixedly secured to said two support beams; at least two spaced, longitudinal, cylindrical tubular members which protrude through said apertures in said intermediate walls and said end walls at a lower portion of said end walls between said feet and said upper portion thereof, and said at least two tubular members are fixedly secured to said plurality of plate-like intermediate walls and to each of said end walls said tubular members are provided with end cap members on the portions protruding through said endwalls, means for connecting one of said tubular memebers to said suction means and for connecting said blowing means to a different tubular member, said cap members arranged to receive connections for connecting a compressed air means to said one of said tubular members and to connect an underpressure means to said different tubular member.

2. A packaging machine as claimed in claim 1, which includes a centrally located rotatable control shaft supported by said plurality of plate-like intermediate walls, cam means secured to said control shaft, a pair of spaced apart oppositely disposed levers pivotably secured to said plate and supporting said suction means at their upper ends with a lower end of each of said levers juxtaposed said cam means, a roller means on said lower end of each of said levers, said roller means being operatively engaged with said cam means.

* * * * *